June 21, 1960  W. C. BRANDER  2,941,437
THREADLESS BOLT HAVING A WEDGE SHAPED RETAINING KEY
Filed May 17, 1957

INVENTOR.
WILLIAM CAMPBELL BRANDER
BY
Reynolds, Beach + Christensen
ATTORNEYS

United States Patent Office 2,941,437
Patented June 21, 1960

2,941,437

THREADLESS BOLT HAVING A WEDGE SHAPED RETAINING KEY

William Campbell Brander, Kalispell, Mont.
(Conrad National Bank, % J. G. Edminston)

Filed May 17, 1957, Ser. No. 659,870

5 Claims. (Cl. 85—7)

The present invention relates to a bolt, using the term in the generic sense to include any form of shank with a head on one end thereof, whether applied or formed integrally, together with securing means for engagement with the opposite end of the shank to retain the shank with its head pressed firmly against one face of a work piece through which it is passed, and with the securing means pressed firmly against the opposite face of the work piece. The securing means according to this invention is other than the customary nut threaded upon the protruding end of the shank, and is of the nature of a key which by its bearing at one edge against the work piece and at its opposite edges against the shoulder of a slot through the shank merely retains the two parts of the work piece drawn firmly together and holds them thus, but which can be quickly engaged or released. In addition to the assembly, this invention relates also to such a key, several forms whereof are illustrated.

Keys which are wedge-like or pointed, when viewed flatwise, that is to say, whose opposite bearing edges diverge from the entering end and along their lines of bearing, have been employed heretofore. As the key is driven tight such divergent edges urge the slotted end of the bolt axially away from the opposite headed end, and so draw the headed end tightly to its seat. The angle of divergence must be such as will produce appreciable axial movement of the bolt shank, and hence after the wedge-like key is driven tight, when the shank is subject to axial forces tending to withdraw it from the work, the angularity of its bearing edges tends to produce a lateral component acting upon the key to urge the latter reversely from slot. It has been suggested that the key may also have opposite faces which converge and so can be wedged between the side margins of the slot, to deter backing out of the key, but here again the lateral wedging occurs with movement of the key in the longitudinal wedging direction, and the slightest slackening of either wedge releases the key and it can readily back out, under the influence of axial, tensional forces acting upon the shank.

According to the present invention there is such relationship between the lateral wedging of the thickness of the key in the width of the slot, and the longitudinal wedging that causes the bolt's head and the key to squeeze the work piece, that any axial force that would tend to produce a lateral component on the fully entered key, urging it transversely of the slot, can act only in the direction to increase the lateral wedging force. Since the key cannot be wedged laterally materially beyond the point where its bearing edge squeezes the work piece tightly, it follows that the key is self-locking, and cannot be forced out by the components of tensional forces in the bolt. It can, however, be forced out with sufficient ease by a force applied to its entering end, in a direction transversely of the shank. Its entering edges may be sloped to effect a forcing and squeezing action upon the shank and the work piece, up to an initial point where the maximum intended force is applied, but beyond that initial point its opposite bearing edges are slightly reversely sloped, giving it in conjunction with its lateral wedging the self-locking action referred to above.

As has been stated, the key of this invention can be, and preferably is, so formed that it can serve, like known keys, to draw the shank axially into tight bearing engagement with the work, preliminarily to the key's movement into its retaining position, but its primary purpose is retention rather than driving. Moreover, such keys can be provided in a cooperating series of successively larger keys, each capable of effecting a certain amount of axial movement of the shank, and in the aggregate capable of forcing the shank step by step throughout an appreciable axial distance, until the retaining key of the series reaches its operative disposition. As the successive keys of such a series define stepped bearing edges, so in a further modified form a single key may have stepped bearing edges.

The key is made preferably in a simple form, such that it is simple to make and install, and its installation and removal can be effected simply by a hammer, yet it can be relied on to hold more securely than any other key known to me.

The invention is shown in the accompanying drawings in a presently preferred form, and in several alternative forms.

Figure 5:
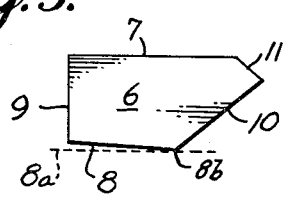
Figure 6:
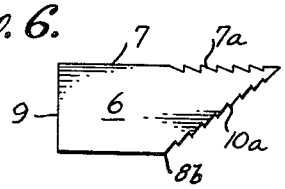
Figure 7:
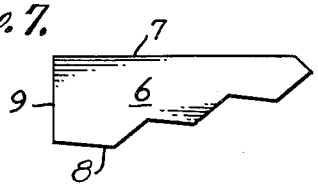
Figure 4:
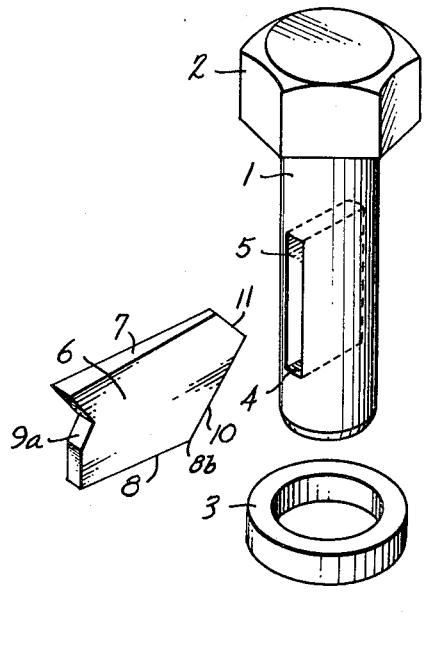
Figure 4 is an exploded isometric view, illustrating the several components of the bolt and securing means.

Figures 5, 6, and 7 are elevational views of a variant of the preferred form, and of two alternative forms, respectively, of the key.

In referring to a bolt, the term is used in the generic sense as stated above, to include any type of shanked element formed or provided at one end with a head, and having a securing means engageable with its opposite end. The head may be permanently a part of the shank, or it may be applied thereto and removable therefrom, or in lieu of a head the end of the shank may be secured within a base or work piece, as a stud bolt. Normally, the head would be permanently fixed to the shank, and only the securing means for the opposite end would be removable.

Such a bolt is shown in the drawings as a means for securing tightly together a plate A and a plate B, as representative of any elements that such a bolt might be intended to retain in operative engagement. The bolt shank 1 passes through registering apertures provided in the plates A and B, with its head 2 pressed into firm engagement with one face of the work piece, the exposed face of the plate A, and with the securing means in equally firm engagement with the opposite face of the work piece, that is, the exposed face of the plate B. A washer 3 may be employed, and if it is, constitutes in effect a part of the total thickness of the workpiece. By the employment of washers of graded thickness, a given bolt and securing means can be used for work pieces of somewhat different thicknesses, but otherwise a given bolt and securing means are provided for securing a work piece of a given thickness only.

At a predetermined distance from the head 2, determined by the effective thickness of the work piece, and facing this head 2, a transverse shoulder 4 is formed in the shank 1. Although the shoulder might be formed by cutting a flat into one side of the shank, it is preferred that this be formed by cutting a slot 5 through the shank, oriented in a plane generally lengthwise of the shank, and through the axis thereof. The edge of the slot which is more distant from the head 2 constitutes the shoulder 4. This shoulder is disposed approximately, or exactly, at right angles to the axis of the shank, and may be considered as not slanted with relation to that axis. The slot is of sufficient length that its end opposite the shoulder 4 lies within the effective thickness of the work piece.

The securing means consists of nothing more than a key which is generally designated by the numeral 6, but which is of a peculiar size and shape. It is provided with two precisely or approximately parallel bearing edges 7 and 8, which are spaced apart, in the portion of the key of maximum width—that is to say, at an initial point 8b by the precise distance that the shoulder 4 is to be spaced in use from the facing edge of the work piece, that is, from the exposed face of the plate B, if no washer 3 is used, or the nearer edge of the washer, if a washer is employed. The key 6 is of a thickness, at its entering end and throughout the greater part of its length, to pass through the slot 5, and can be forced through the slot into position where its edge 7 bears against the work piece and its edge 8 bears against the shoulder 4. Its initial point 8b is then beyond the end of that shoulder which is distant from the entering end thereof. These edges 7, 8, and 4, and the face of the washer 3 being all perpendicular to the axis (with an exception stated later), all forces in the direction of the axis of the bolt shank act, therefore, on edges of the key which are directly transverse to such forces, and any attempt to pull the bolt shank out is strongly resisted, nor even in the case where the exception applies is there any inclined surface to produce a force or component tending to urge the key, in the direction of its own length, from the slot 5.

Figure 3:
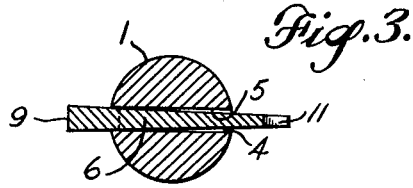
Figure 3 is a transverse sectional view at line 3—3 of Figure 2.

However, the key 6 is not in all portions of a thickness to pass within the slot 5. Rather, at its trailing end, designated at 9, it is of a thickness somewhat in excess of the width of the slot 5, and converges from this thicker end toward its opposite thinner entering end, so that when driven fully home with the edges 7 and 8 engaged as described above, the thicker end 9 will wedge itself, as in Figure 3, into the entrance to the slot 5, and so will strongly resist any force which might urge it backward out of the slot. No force is likely to arise in use that would tend to move the key in the direction of its own length, out of the slot.

It has been suggested that the bearing edges 7 and 8 need not be precisely parallel and perpendicular, in use, to the shank's axis. Preferably such is not the case. Rather, if the edge 7 be considered as perpendicular to the axis, the opposite outer bearing edge 8 is very slightly inclined, as shown by comparison with the perpendicular dash line 8a in Figure 5, so that the edges 7 and 8 converge away from the entering end. This showing in Figure 5 is intended to illustrate the principle, and is not to be taken quantitatively, for the inclination is preferably very slight. Moreover, the inclination is not sloped to assist in forcing the key edgewise more tightly to its seat, but reversely. If any transverse component arises from this reverse slope, its effect is to urge the key farther into the slot, but this only tightens the wedging of the key's opposite faces into the entrance to the slot. The slight slackening of tension in the bolt by this reverse slope at 8 is negligible.

Figure 2:
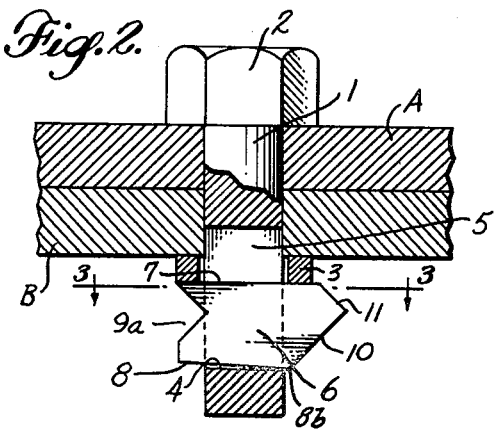
Figure 2 is a sectional view, taken axially of the bolt, illustrating parts, in the preferred form of the invention, in the fully engaged retaining position. The relative slope of the bearing edges is herein somewhat exaggerated, for emphasis.

To assist in drawing the parts A and B of the work piece tightly together, one edge 10 at the thinner entering end of the key 6 is inclined with respect to and converges from the initial point 8b towards the opposite edge 7, forming an incline which may engage with the shoulder 4 and so, by reaction against the work piece at the opposite edge 7, the parts of the work piece will be urged together while the key is being driven into its secured position. This converging edge 10 may be sloped as steeply or as gently as may be desired, bearing in mind the desirability of keeping the key short in length. When the key is fully seated, the point formed by the edges 10, 11 no longer bear anywhere; see Figure 2.

The tip of the key at its entering end would be long and pointed if the edges 7 and 10 were permitted to meet. They key is shortened by beveling off the tip, at 11, but more important than the shortening, this provides a nose located somewhat distantly from the face of the work piece, whereon hammer blows may fall whenever the key is to be driven out of its slot.

Figure 1:
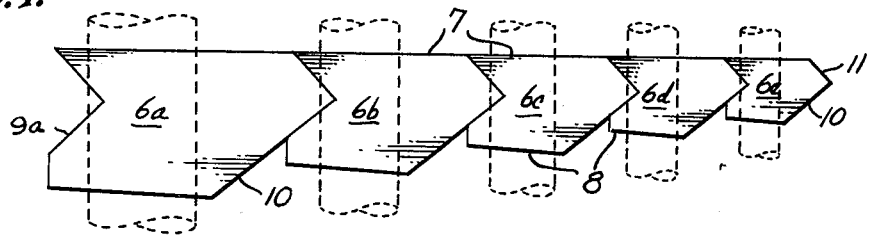
Figure 1 is an elevational view of a cooperative series of individual, differently sized keys, according to the invention.

The key is driven into retaining position by striking its end 9 with a hammer. It will be helpful, in some cases, to arrange the keys in a succession of sizes, as indicated in Figure 1 at 6a, 6b, 6c, 6d, 6e. In such a series the thicker end of each smaller key will pass through the slot of a larger-sized bolt, but will wedge in the slot of the bolt for which it is intended. The smaller keys can therefore be used as successive axially forcing wedges, to advance the shank axially by steps. To this end each is notched at its trailing end, at 9a, to interfit with the nose formed at the entering end of the next larger key, as is shown in Figure 1. So interfitted all bearing edges 7 are in alignment, and the several bearing edges 8 form steps. The series can be driven in by striking the end 9a of the last and largest key in the series.

The stepped idea, to assist in driving the key home, can be incorporated in a single key, as indicated in Figure 7. Figure 6 shows another form for assisting in forcing the key home, and retaining it against slippage when only partially driven home. Here the edges at the entering end, one or both, are serrated at 7a and 10a.

I claim as my invention:

1. A bolt and securing means therefor comprising a shank intended to be passed through a work piece of given effective thickness, a head upon one end of said shank to bear against a first face of the work piece, the shank having a through slot of given width disposed in a general axial plane, distantly from said head, the end of the slot which is the more distant from the head defining a shoulder facing the head and located by a predetermined distance from the head in excess of the effective thickness of the work piece, a retaining key of substantially rectangular cross-section inserted within said slot, its opposite faces flaring continuously from a thickness at its entering end which is less than the given width of the slot to a thickness at its opposite end which is in excess of such given width, whereby the key will wedge transversely within the slot at a wedging point where the key's thickness is equal to the width of the slot, said key having edge portions including an upper edge bearing against the second face of the work piece, and having a lower edge flaring slightly away from said upper edge from the said opposite end of the key towards the entering end to an initial point, the entering end of the key having a lower sloping edge tapering toward said upper edge from said initial point, the distance from the wedging point of the key to the said initial point being greater than the diameter of the shank whereby the key tends always to move, under the influence of tension lengthwise of the bolt, reacting through its converging edges, in the wedging direction as between its tapering faces when said initial point has been passed through said slot.

2. A bolt and securing means therefor as in claim 1, wherein the convergent edge portions of the key in advance of the initial point are serrated to impede backing out of the key during its insertion and until it has been entered beyond such initial point.

3. A bolt and securing means therefor as in claim 1, wherein the portion of the key in advance of the said lower flaring edge is stepped, each step including a common upper edge and a lower sloping edge sloped towards its entering end, and a lower retaining edge sloped oppositely beyond the initial point.

4. A bolt and securing means therefor as in claim 1, the entering end of the key converging towards a point intermediate its edges, in advance of the initial point.

5. A bolt and securing means therefor as in claim 4, the trailing end of the key being notched complementally to the point at its entering end, whereby a plurality of successively thicker and wider keys similarly formed may be interengaged endwise by their pointed and notched ends, respectively, and forced successively through said slot until the proper key reaches the wedging point.

References Cited in the file of this patent

UNITED STATES PATENTS

| | | |
|---|---|---|
| 181,253 | Derrick | Aug. 22, 1876 |
| 662,023 | Reade | Nov. 20, 1900 |
| 957,030 | Berryman | May 3, 1910 |
| 1,348,727 | McKinlay | Aug. 3, 1920 |
| 2,589,781 | Cottrell | Mar. 18, 1952 |